United States Patent
Goszyk et al.

(10) Patent No.: US 7,227,528 B2
(45) Date of Patent: Jun. 5, 2007

(54) THIN ELECTRONIC REFERENCE DEVICE

(75) Inventors: Kurt A. Goszyk, Washington Crossing, PA (US); Gary Leib, Darby, MO (US); Pang Lee, Hong Kong (CN)

(73) Assignee: Franklin Electronic Publishers, Inc., Burlington, NJ (US)

( * ) Notice: Subject to any disclaimer, the term of this patent is extended or adjusted under 35 U.S.C. 154(b) by 591 days.

(21) Appl. No.: 10/752,106

(22) Filed: Jan. 6, 2004

(65) Prior Publication Data
US 2005/0146506 A1 Jul. 7, 2005

(51) Int. Cl.
*G09G 5/00* (2006.01)
(52) U.S. Cl. .......................................... 345/156; 345/60
(58) Field of Classification Search ................ 345/100, 345/114, 107, 173, 206, 60, 156, 157–172; 349/86, 87, 88, 89; 281/16; 434/178, 317, 434/16
See application file for complete search history.

(56) References Cited

U.S. PATENT DOCUMENTS

| | | | | |
|---|---|---|---|---|
| 5,476,336 A | * | 12/1995 | Osiecki et al. | 402/79 |
| 5,534,888 A | * | 7/1996 | Lebby et al. | 345/672 |
| 6,167,233 A | * | 12/2000 | Gresser et al. | 434/308 |
| 6,906,705 B2 | * | 6/2005 | Matsuo et al. | 345/206 |
| 2003/0006969 A1 | * | 1/2003 | Barras | 345/169 |

* cited by examiner

*Primary Examiner*—Nitin I. Patel
(74) *Attorney, Agent, or Firm*—Reed Smith LLP

(57) ABSTRACT

An electronic reference device is disclosed that can be used by a user when reading a book. The electronic reference device functions as a dictionary for the reader to look up words as they read. It can also have various other functions that would be suitable for a portable electronic device. The device has a main body that houses a display and a keyboard section. The main body is thin enough to be able to fit between the pages of the book. The top of the device is slightly larger than the main body and the battery is not housed in the main body.

20 Claims, 6 Drawing Sheets

THIN ELECTRONIC REFERENCE DEVICE

BACKGROUND

A. Field of Invention

This invention relates to an electronic device that can be used as a reference guide by a person reading a book and more particularly to a device that can be easily carried within the book and serve as a bookmark without damaging the pages of the book nor be damaged itself.

B. Description of the Related Art

Certain electronic reference devices have been designed to be used when reading a book. A dictionary is one such device, useful when reading a book. These devices can also be proportionately sized so as to be able to fit inside a book so that it is readily accessible to the user while reading the book. These devices can also be of an appropriate weight so as to be carried with the book. It is important that these devices are of suitable size and weight not to cause damage to the pages of the book nor to the binding of book.

One such prior art device is described in U.S. Pat. No. 6,424,984, which issued to Zhi Yao. Yao describes an electronic dictionary that has a keyboard section and a display housing section. The keyboard section has a keypad with the keys incorporated onto the surface of the keypad. The display section is thicker than the keyboard section. The display section houses the display screen and the battery.

The relative difference in thickness between the keyboard section and the display section creates a ledge at the point where the two sections join. This ledge is used to keep the electronic dictionary from completely sliding into a book when the keyboard section is placed between pages of the book. In that case, the display section will stick out of the top of the book while the keypad section rests between the pages of the book.

This design has several disadvantages. One disadvantage exists because the thicker and heavier display section will rest on the top edges of the pages. Book pages can be damaged by the weight of the thicker display section weighing down on the top edges of the pages. The danger for damaging the pages is particularly acute when the pages that the electronic dictionary rests upon are few in number and/or do not include the more rigid book cover. In both of these situations, the pages would be more susceptible to the weight of the display section.

Another disadvantage to this design occurs when the book is carried by the user. When finished reading, the user can close the book with the device located in between pages of the book and carry the book and device together. In doing so, however, the display section is still exposed and not protected by the book. Thus, it will be subject to the wear and tear caused by contact with other objects. Damage to the display will effective render the device useless. In addition, the danger of damaging the pages increases due to the fact that the impact due to any contact will increase the pressure on the pages.

Another disadvantage exists if the user tries to protect the display by placing the entire device between the pages of a closed book. Given the thickness of the display section, the pages of the book and the binding of the book will be stressed and likely damaged when the book is closed containing the entire device.

C. SUMMARY OF THE INVENTION

The current invention involves a portable electronic reference device that is capable of being inserted in between pages of a book and used as a bookmark without causing damage to the pages of the book nor causing damage to the device itself. According to one aspect of the invention, the main body of the portable electronic reference device have a keyboard section and a display section. The keyboard section and the display section have the same thickness. Both sections will be thin enough to allow main body of the device to fit in between the pages of a book without damaging the pages or binding. The battery is located in a separate section that is attached to the device by an external wire. The wire is attached to the device through a conduit.

D. BRIEF DESCRIPTION OF THE DRAWINGS

The accompanying drawings are included to provide an understanding of the invention and constitute a part of the specification.

E. DESCRIPTION OF THE INVENTION

Figure 1:
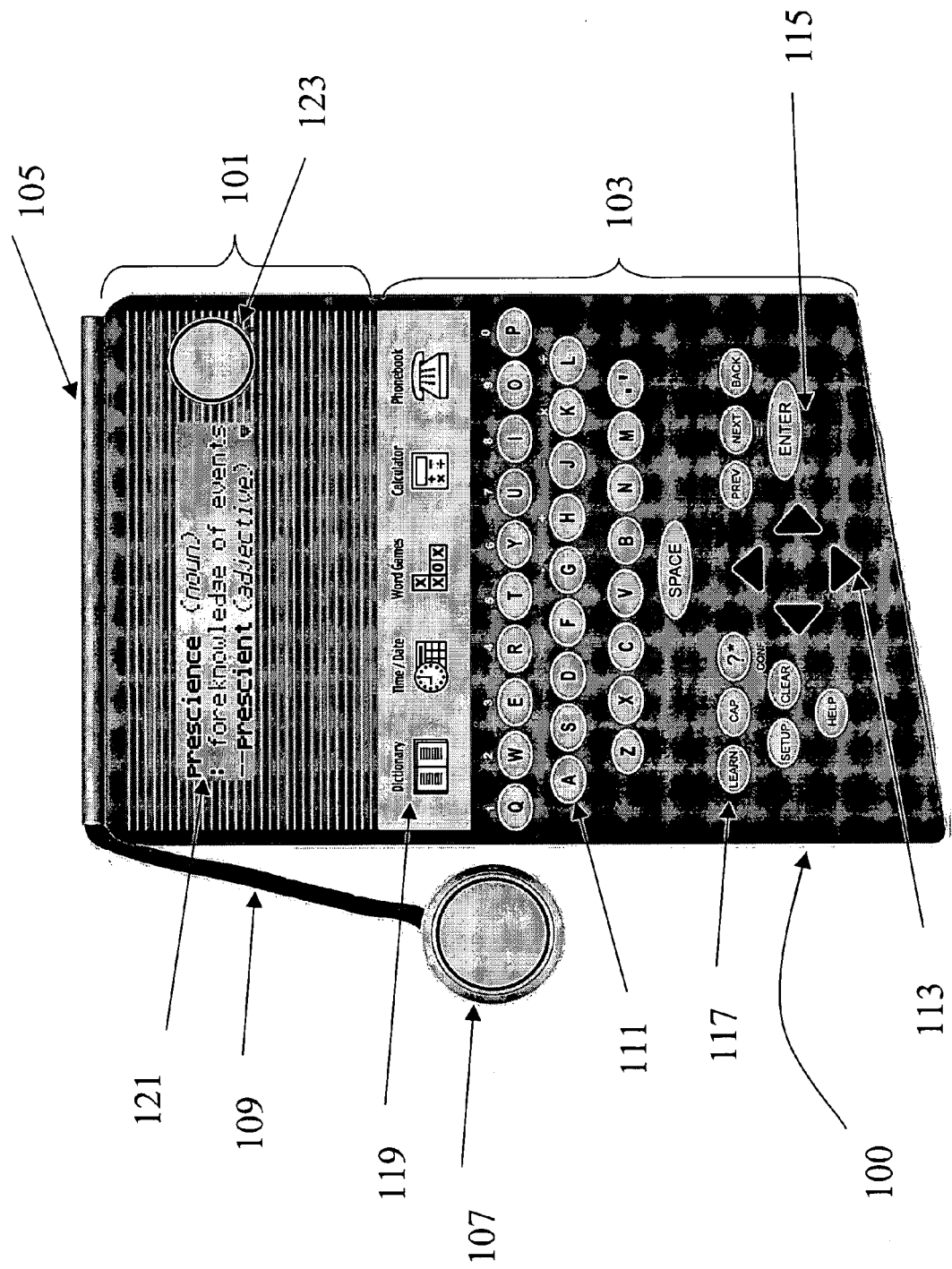
FIG. 1 depicts the front view of an apparatus that implements one embodiment of the present invention.

FIG. 1 depicts the layout of a device 100 that implements one embodiment of the present invention. The main body of the device 100 has a display section 101 and a keyboard section 103. The device 100 also has a conduit 105 on top of the display section 101. A battery housing 107 is connected to the device 100 by a wire 109 that enters the device through the conduit 105.

The keyboard section 103 has various keys that allow the user to input data into the device 100. In one embodiment of the present invention, the keyboard section has a set of alphabetic keys 111. The user can use these keys to type in words to be processed by the device. Below the alphabetic keyboard, there is a set of four keys corresponding to the four directional arrows 113. These keys can be used by the user to navigate through different menus displayed on the screen. Next to the directional arrows are a set of keys 115 marked as (1) prev, (2) next, (3) back, and (4) enter. These keys are also available to allow the user to navigate various software menus displayed on the screen. To the left of the directional keys 113 are six miscellaneous keys 117.

Above the alphabetic keys, the device 100 has five menu keys 119 that allow the user to select different modes of operation for the device. As shown in this embodiment, the five modes are (1) dictionary, (2) time/date, (3) word games, (4) calculator, and (5) databank. Each mode allows the user to access different functions of the device. The number and type of keys can vary depending on the type and purpose of the device.

Above the keyboard section 103 is the display section 101. The display section 101 has a screen 121 to display data to the user. In one embodiment of the present invention, the display screen is an LCD screen, but it can be any screen suitable to displaying graphics and/or text to the user. Beside the display screen is a power button 123 that allows the user to turn the device on and off.

An electrical wire 109 extends from the display section 101 through the conduit 105 to a battery housing 107. The battery housing 107 will contain a battery that will supply power to the device 100. The battery housing 107 is made of a rigid and light material. The wire 109 is comprised of a flexible and durable insulation material.

Figure 2:
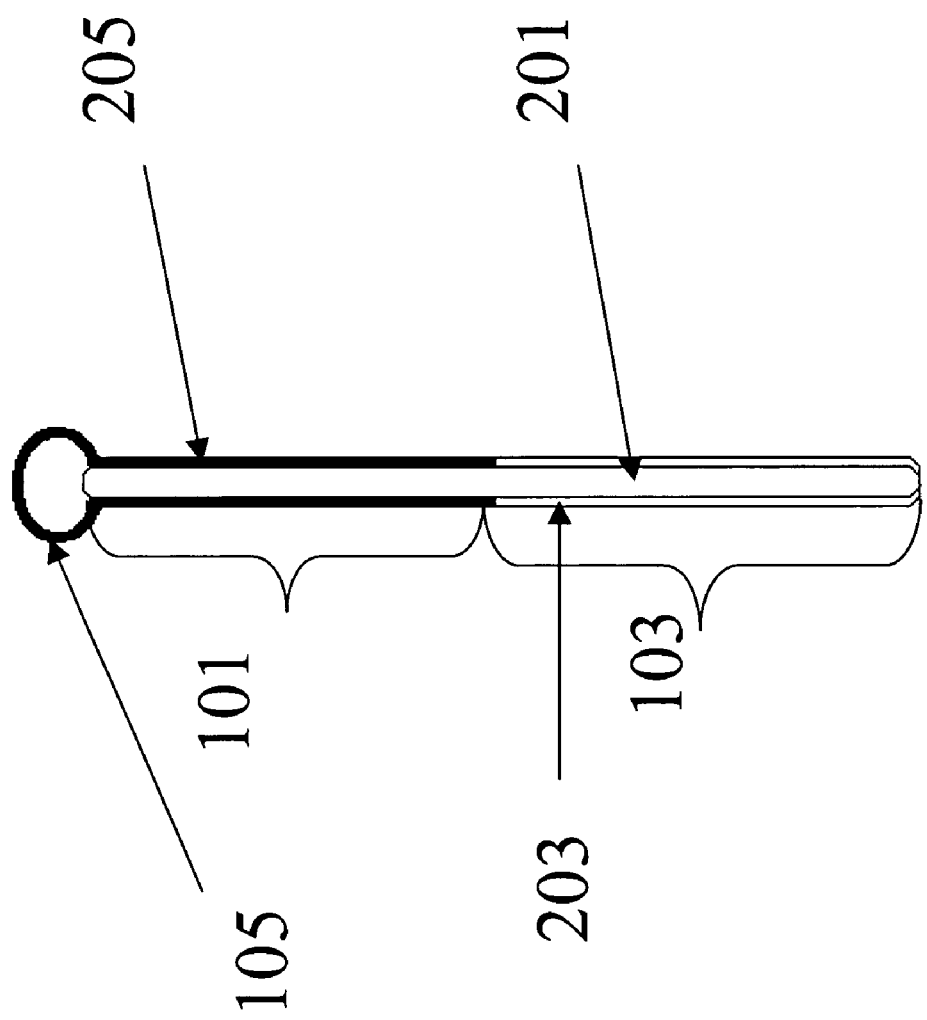
FIG. 2 depicts a side view of an apparatus that implements one embodiment of the present invention.

Referring to FIG. 2, which depicts a side view of one embodiment of the present invention, the composition of the main body of the device can be seen. The keyboard section 103 is primarily composed of a thin flexible PC circuit board 201. The circuit board 201 contains the electrical connections for the device 100. The portion of the flexible PC circuit board that is in the keyboard section is covered with a thin vinyl laminate 203. The keys (111, 113, 115 and 117) are printed onto the laminate and do not rise above the surface of the laminate 203. The vinyl laminate is pliable so that a user pressing on the keys will be able to create an electrical connection in the circuit board 201 below the laminate 203 to register that key being pressed with the processor.

The exterior covering 205 of the display section 101 is composed of a hard durable material. In one embodiment of the present invention, metal is used. The metal covering 205 has appropriate openings to allow display of the screen and physical access to the power button.

The conduit 105 is located above the display section 101. The conduit 105 has an opening that allows an electrical connector to enter into the display section 101. The conduit 105 is a cylindrical tube that abuts the top of the display section 101, but it can be any shape that allows an electrical connector to enter the display section 101. The conduit 105 located above the display section 101 can also be made of metal and the conduit 105 and the display covering 205 can be composed of one integral piece. The hard metal of the covering 205 will protect the display screen and the circuit components beneath it. The rigidity of the covering 205 will also provide support and protection to the more flexible keyboard section 103.

The size of the device is proportional to the size of a typical paperback book. In one embodiment of the present invention, the height of the device is 144 millimeters and the width of the device is 92 mm. The thickness of the device is 2 millimeters.

The device can be made so thin because the battery unit is separated from the main body of the device. In addition, the thickness of the device is uniform for both the display section 101 and the keyboard section 103. As such, the entire main body of the device 100 will easily fit in between two pages of a closed book without causing any damage to the pages or to the binding of the book. The device can then act as a bookmark to designate the relevant page for the user. In addition, by having the entire device within the book, the display section and the flexible keyboard section are protected by the book.

The conduit is slightly bigger than the thickness of the device. In one embodiment, the diameter of the conduit is 4.25 mm. Since the conduit has a diameter slightly larger than the thickness of the display and keyboard sections, the conduit can either (1) be placed outside of the book while the main body is inside the device or (2) be placed inside the book along with the main body of the device.

Figure 3:
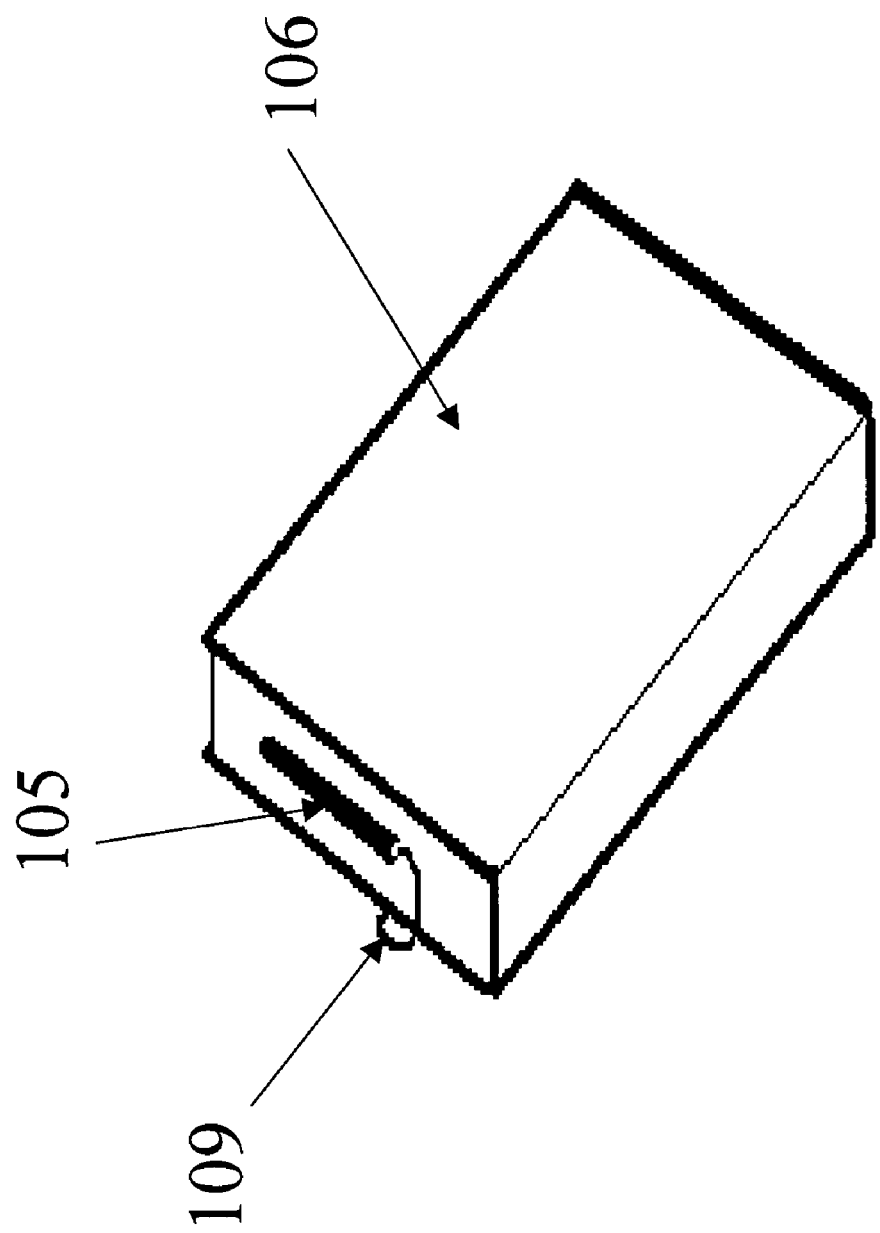
FIG. 3 depicts one perspective view of an apparatus that implements one embodiment of the present invention as carried within a closed book.

As depicted in FIG. 3, when the conduit is placed outside of the book 106, the conduit 105 will rest on the top edges of the book. The conduit 105 will stop the device from sliding completely within the book 106. The conduit will cause minimal damage to the pages on which it rests because it is small and light. In addition, since the conduit is only 4 millimeters, it will not extend very much outside of the closed book. Thus, there is reduced danger of damaging pressure exerted on the pages of the book 106 caused by the conduit 105 contacting an outside object. The extension of the conduit 105 outside of the book also does not jeopardize the life of the device since the conduit 105 is made of a durable material and is not critical to the operation of the device 100.

Figure 4:
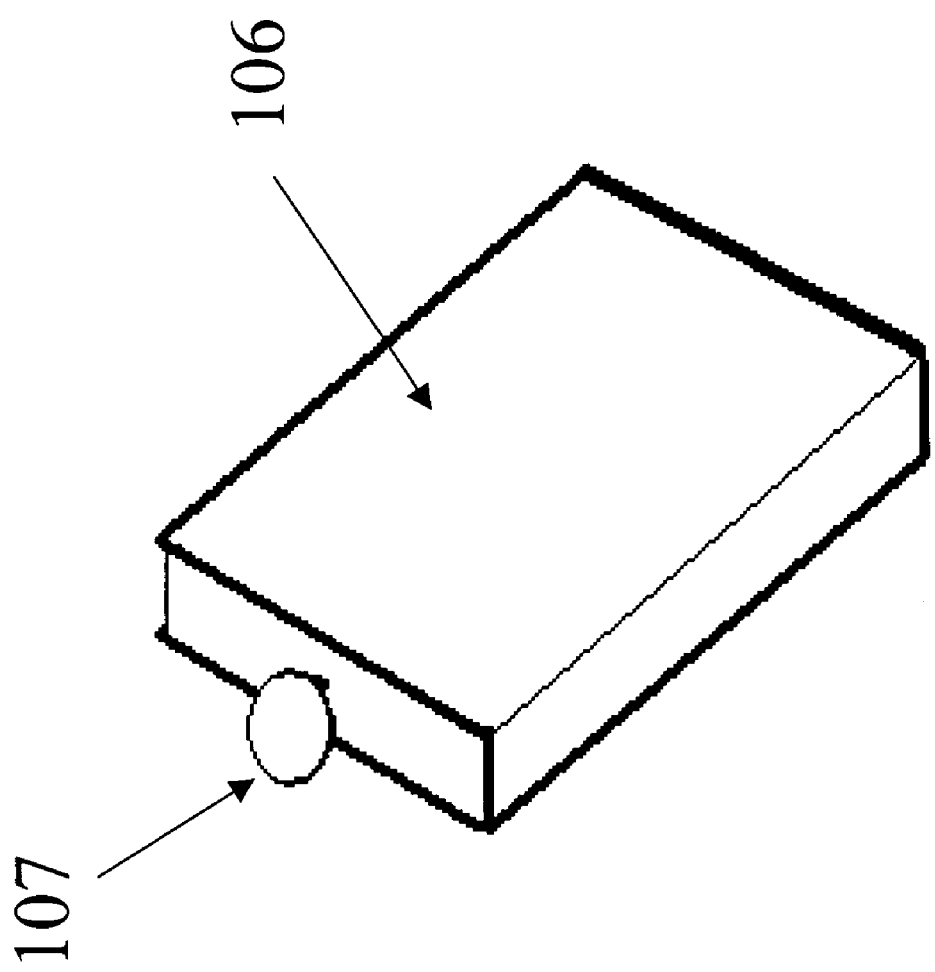
FIG. 4 depicts another perspective view of an apparatus that implements one embodiment of the present invention as it is carried within a closed book.

As depicted in FIG. 4, when the conduit is placed inside the book 106 along with the main body of the device, then there is minimal damage to the book pages and binding of the book because of the small size differential between the conduit and the display and keyboard sections. When the conduit is also placed inside the device book, the battery housing 107 can then function to hold the device from sliding out of the book. In one embodiment, the diameter and thickness of the battery housing 107 are 25 mm and 6 mm respectively.

Figure 5:
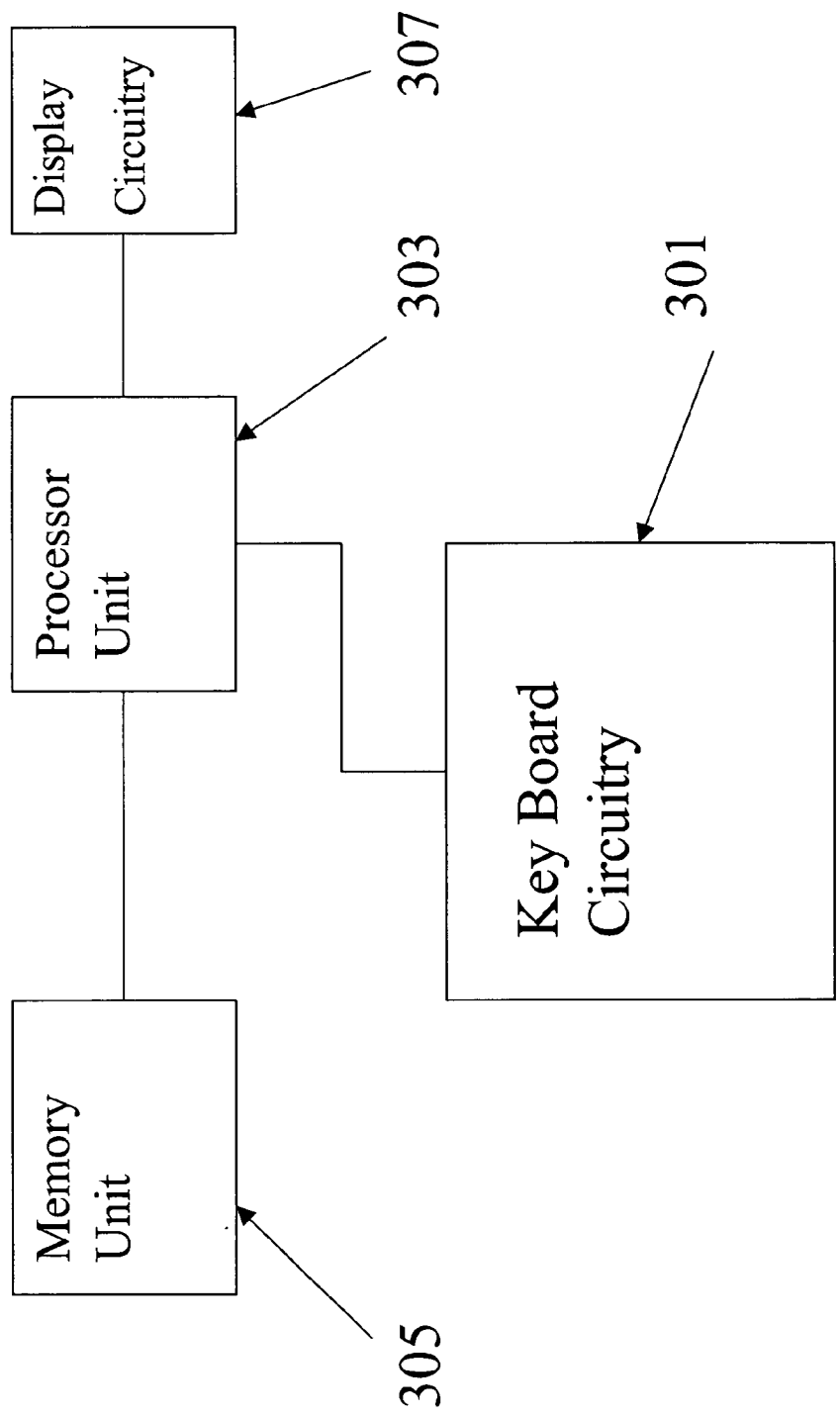
FIG. 5 depicts a schematic diagram of the components of one embodiment of the present invention.

FIG. 5 details a schematic diagram showing the electrical components of one embodiment of the present invention. It can be seen that the keyboard circuit 301 is electrically connected to a main processor unit 303. The processor 303 is typically located in the display section. The processor 303 can be any microprocessor that is capable of being programmed to perform the various functions required by the device. The processor 303 is also electrically connected to a memory unit 305. The memory unit acts as the main storage area for data entered by the user. The memory unit 305 can be comprised of memory chips that are permanently located within the apparatus. It can also include an external memory unit that is temporarily connected to the device. The processor 303 is also electrically connected to the display circuit 307. Other circuits, such as a sound unit, can be added to the device without changing the teachings of this invention.

Figure 6:
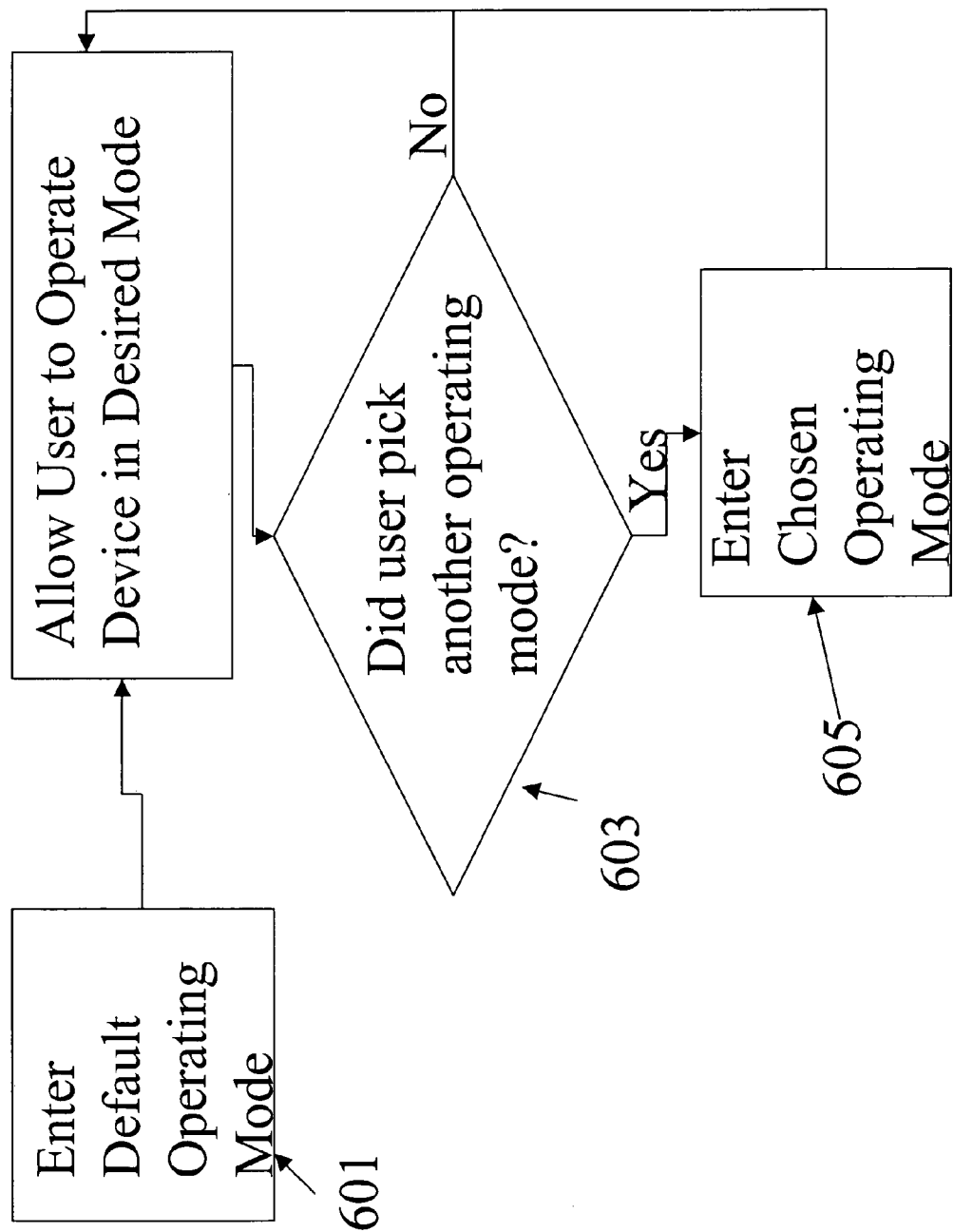
FIG. 6 depicts a flow chart depicting the operation of one embodiment of the present invention.

Referring to FIG. 6, the operation of one embodiment of the device is explained. Upon powering the device, the user will be placed in the default operating mode 601. The user can then immediately use the device in the default operating mode without further delay. If the user wishes to use an operating mode other than the default mode, the user can press any of the menu keys 119. The device 100 will detect those keys in step 603 and the device will run the corresponding operating mode in step 605. For each different operating mode, one or more of the various sets of keys (111, 113, 115, and 117) will be manipulated by the user.

In this embodiment, the default operating mode corresponds to the first menu key which will be the dictionary mode. Under the dictionary mode, the user will be able to enter a word to look up. Upon typing the word using the keyboard and pressing the enter key, the device 100 will display the definition of the word. If the word is misspelled, then the device will display a list of words that are the potential word.

If the user selects the time/date key from the menu keys 119, the device 100 will display the current time and date. The user can change the date and time by using the setup keys 117 in the lower left hand side of the device.

If the user selects the word games key from the menu keys 119, the screen will display various word games that the user can use. Word games available in one embodiment include (a) hangman, (b) Jumble, (c) anagrams, and (d) tic tac toe. The user can use the directional arrow keys 113 located directly below the alphabetic keys 111 to select the appropriate game.

If the user selects the calculator key from the menu keys 119, the device will allow the user to perform various arithmetic functions. In the calculator mode of operation, the alphabetic keys 111 will now be used to input numbers and the arithmetic functions. The numeric values and arithmetic functions are printed above each corresponding key.

If the user selects the databank key from the menu keys 119, the device 100 allows the user to build a user list of words and store them in the device's memory. This user list can be used in conjunction with the games operating mode.

The present invention is not to be considered limited in scope by the preferred embodiments described in the specification. Additional advantages and modifications, which readily occur to those skilled in the art from consideration and specification and practice of this invention are intended to be within the scope and spirit of the following claims:

We claim:

1. A portable electronic device comprising:
    a housing body, having a display section and a keyboard section;
    a processor located in said housing body;
    a conduit coupled to said housing body to allow an electrical connection to an external power source;
    said display section being capable of displaying data and said keyboard section is capable of allowing a user to input data into said apparatus; and
    said housing body being thin enough to fit between pages of a closed book.

2. The portable electronic device as recited in claim 1, wherein said conduit is thicker than said thickness of said housing body.

3. The portable electronic device as recited in claim 2, wherein said conduit is thin enough to fit between pages of a closed book.

4. The portable electronic device as recited in claim 1, wherein said housing body has a substantially uniform thickness.

5. The portable electronic device as recited in claim 1, wherein said keyboard section is comprised of a flexible material.

6. The portable electronic device as recited in claim 1, wherein said display section is comprised of a rigid material.

7. The portable electronic device as recited in claim 6, wherein said conduit is comprised of said rigid material.

8. The portable electronic device as recited in claim 1, wherein said housing body is comprised of a flexible circuit board.

9. The portable electronic device as recited in claim 1, further comprising a battery housing connected to said housing body through said conduit.

10. The portable electronic device as recited in claim 9 wherein said battery housing has dimensions sufficient to hold said device from slipping out of a closed book.

11. The portable electronic device as recited in claim 1, wherein said housing body does not damage a closed book's spine when placed inside said closed book.

12. The portable electronic device as recited in claim 1, further comprising memory storage connectable to said processor.

13. The portable electronic device as recited in claim 12 wherein said memory storage is separable from said apparatus.

14. The portable electronic device as recited in claim 1, wherein said conduit spans the top of said housing body.

15. A portable electronic device comprising:
    a main housing; said main housing comprising: (1) a processor capable of performing functions on data; (2) data keys electrically connected to said processor that are capable of inputting data to said processor; and (3) a display electrically connected to said processor that is capable of displaying said data;
    a power source housing connected to said main housing through a conduit; and
    said main housing being thin enough to fit in between pages of a closed book.

16. The portable electronic device as recited in claim 15, wherein said processor is capable of performing dictionary functions.

17. The portable electronic device as recited in claim 15, wherein said processor is capable of performing calendar functions.

18. The portable electronic device as recited in claim 15, wherein said processor is capable of performing game functions.

19. The portable electronic device as recited in claim 15, wherein said processor is capable of performing calculator functions.

20. The portable electronic device as recited in claim 15, wherein said processor is capable of creating and storing a user list.

* * * * *